Patented Mar. 19, 1940

2,194,315

UNITED STATES PATENT OFFICE 2,194,315

PURIFICATION OF DEXTROSE

Harry Meisel, North Bergen, N. J., assignor to Corn Products Refining Company, New York, N. Y., a corporation of New Jersey No Drawing. Application October 21, 1938, Serial No. 236,245

1 Claim. (Cl. 127—46)

This invention relates to the removal of impurities from dextrose.

In the manufacture of dextrose for certain specialized purposes it is imperative that the purity of the product be even greater than the ordinary commercial purities which frequently run above 99½%. For example, dextrose used in the manufacture of medicine must be free from the traces of copper or iron picked up from the copper converters and iron pipes in the dextrose manufacturing process. Likewise, in the manufacture of sorbitol from dextrose, it is essential that practically no magnesium be present in the dextrose. However, in the commercial production of dextrose, all batches will contain some degree of iron, copper, calcium, magnesium, and other metals.

In supplying the market with dextrose which is substantially free from such metal impurities, it has heretofore been necessary to analyze numerous batches of dextrose and select those batches found to contain, for one reason or another, less than one part per million of the undesired metal impurities or else subject the commercial batches to further refining operations of a costly nature.

The object of the present invention is to provide an improved method whereby dextrose free from undesirable traces of metal may be readily and economically obtained.

The invention comprises, in brief, the treatment of the starch converted dextrose liquors with zeolites.

Although zeolites have long been employed for softening hard water and the base-exchanging and regenerative properties of zeolites are well known, the use of the same for the purpose of removing the metal contents from sugar liquors such as starch converted dextrose liquors has not heretofore been employed. Shortly after the invention of artificial zeolites by Gans in 1906, it was believed that the base-exchanging property of zeolites could be employed for various purposes such, for example, as obtaining gold from sea water. However, as far as I am aware, there has heretofore never been any practical use made of zeolites except in the water softening field.

I have now found that zeolites may be successfully employed for the removal from sugar liquors such as starch converted dextrose solutions of metals below sodium in the electromotive series.

The following examples, which are purely typical and informative, illustrate the manner in which the invention may be carried out.

Example 1. (*Removal of iron and copper*).—A batch of forty gallons of 28° Baumé dextrose containing 50 parts per million (.005%) iron and seven-tenths parts per million (.00007%) copper was agitated for one hour at 160° F. with one pound of a 5.0 pH zeolite and then filtered. The filtrate was subjected to the usual dextrose crystallization process and the resulting refined dextrose contained no copper or iron.

Example 2. (*Removal of magnesium*).—Four thousand gallons of 28° Baumé anhydrous dextrose liquor containing 2 parts per million (.0002%) magnesium, was mixed with 100 pounds of a decolorizing carbon and 50 pounds of 5.0 pH zeolite, and agitated for thirty minutes at between 150–160° F. At the end of this period the mixture was filtered and the dextrose liquor crystallized.

The finished product was found to contain 0.6 part per million (.00006%) magnesium.

It has been found that for the best results the pH of the zeolite employed should be approximately 5.0.

The process may be employed, in like manner, to remove other metals such as barium, calcium, aluminum, zinc, chromium, nickel, tin and lead.

The term "zeolite" as used herein is employed in its broad sense to cover artificial zeolite or hydrated alumino-silicate and their exchangeable bases.

I claim:

Method of removing from starch converted dextrose liquor soluble salts of metals below sodium in the electromotive series which comprises mixing, substantially in the proportions and under the conditions herein indicated, 40 gallons of 28° Baumé starch converted dextrose solution and 1 pound of 5.0 pH zeolite, agitating the mixture for approximately thirty minutes at a temperature of substantially 150° F., and then filtering the mixture and crystallizing the filtrate.

HARRY MEISEL.